(12) United States Patent
Mohanty et al.

(10) Patent No.: US 7,912,491 B2
(45) Date of Patent: Mar. 22, 2011

(54) TECHNIQUES TO EFFICIENTLY TRANSMIT CONTROL MESSAGES TO IDLE AND SLEEP MODE USERS IN OFDMA BASED WIRELESS NETWORKS

(75) Inventors: Shantidev Mohanty, Hillsboro, OR (US); Muthaiah Venkatachalam, Beaverton, OR (US); Shailender Timiri, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 11/689,552

(22) Filed: Mar. 22, 2007

(65) Prior Publication Data
US 2008/0084941 A1 Apr. 10, 2008

Related U.S. Application Data

(60) Provisional application No. 60/850,851, filed on Oct. 10, 2006.

(51) Int. Cl.
*H04B 7/00* (2006.01)
*H04B 1/38* (2006.01)
*H01Q 11/12* (2006.01)

(52) U.S. Cl. ...... 455/522; 455/528; 455/574; 455/127.1; 455/127.5

(58) Field of Classification Search .................. 370/338; 375/260; 455/522, 528, 574, 127.1, 127.5
See application file for complete search history.

(56) References Cited

U.S. PATENT DOCUMENTS

| 7,319,680 | B2 | 1/2008 | Cho | |
|---|---|---|---|---|
| 2003/0093195 | A1* | 5/2003 | Ishikawa | 701/19 |
| 2005/0063331 | A1 | 3/2005 | Kim et al. | |
| 2005/0099988 | A1 | 5/2005 | Wang et al. | |
| 2007/0286066 | A1* | 12/2007 | Zhang et al. | 370/208 |
| 2008/0187136 | A1* | 8/2008 | Zhang et al. | 380/270 |

OTHER PUBLICATIONS

International Search Report and Written Opinion for PCT/US2007/021720 mailed Apr. 15, 2008, 11 pages.

* cited by examiner

*Primary Examiner* — Huy Phan
*Assistant Examiner* — Munsoon Choo
(74) *Attorney, Agent, or Firm* — Blakely, Sokoloff, Taylor & Zafman LLP (57) ABSTRACT

An embodiment of the present invention provides an apparatus, comprising a base station (BS) operable to communicate with at least one mobile station (MS), wherein said base station is adapted to use a need-based common channel for the transmission of control messages to idle mode and sleep mode mobile stations.

25 Claims, 4 Drawing Sheets

TECHNIQUES TO EFFICIENTLY TRANSMIT CONTROL MESSAGES TO IDLE AND SLEEP MODE USERS IN OFDMA BASED WIRELESS NETWORKS

CROSS REFERENCE TO RELATED APPLICATIONS

This application claims the benefit of U.S. provisional application No. 60/850,851 filed 10 Oct. 2006, entitled, "TECHNIQUES TO EFFICIENTLY TRANSMIT CONTROL MESSAGES TO IDLE AND SLEEP MODE USERS IN OFDMA BASED WIRELESS NETWORKS."

BACKGROUND

In a wireless communication system, mobile stations, which may be referred to as MS, can be in one of the following states: State I: Receive or send traffic while in one or more active call sessions; State II: Do not receive or send traffic in any of the active call sessions; and State III: Not engaged in any active call session.

When an MS is either in state II or III, it can temporarily shut down all transmit and receive activities with the network. Therefore, these situations can be used as battery conserving and wireless resource saving opportunities. Although not limited in this respect, wireless networks based on Institute for Electronic and Electrical Engineers (IEEE) standard 802.16e may use sleep mode and idle mode operation to take advantage of State II and State III, respectively. Thus, an MS in these networks operates in sleep mode when it does not receive or send traffic while active in one or more call sessions. Similarly, it operates in idle mode while not engaged in any active call session Thus, a strong need exists for techniques to efficiently transmit control messages to idle and sleep mode users in orthogonal frequency division multiplexing access (OFDMA) based wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth™, ZigBee®, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "multicast/broadcast" as used herein may include, for example, multicast communication, broadcast communication, wireless multicast communication, wired multicast communication, wireless broadcast communication, wired broadcast communication, multicast communication over the Internet or over a global communication network, broadcast communication over the Internet or over a global communication network, multicast communication using TCP/IP, broadcast communication using TCP/IP, webcast communication (e.g., using the World Wide Web), and/or other types of communication, e.g., non-unicast communication.

In a wireless communication system, mobile stations (MS) may be in one of the following states:

State I: Receive or send traffic while in one or more active call sessions;

State II: Do not receive or send traffic in any of the active call sessions; and State III: Not engaged in any active call session.

Figure 2:
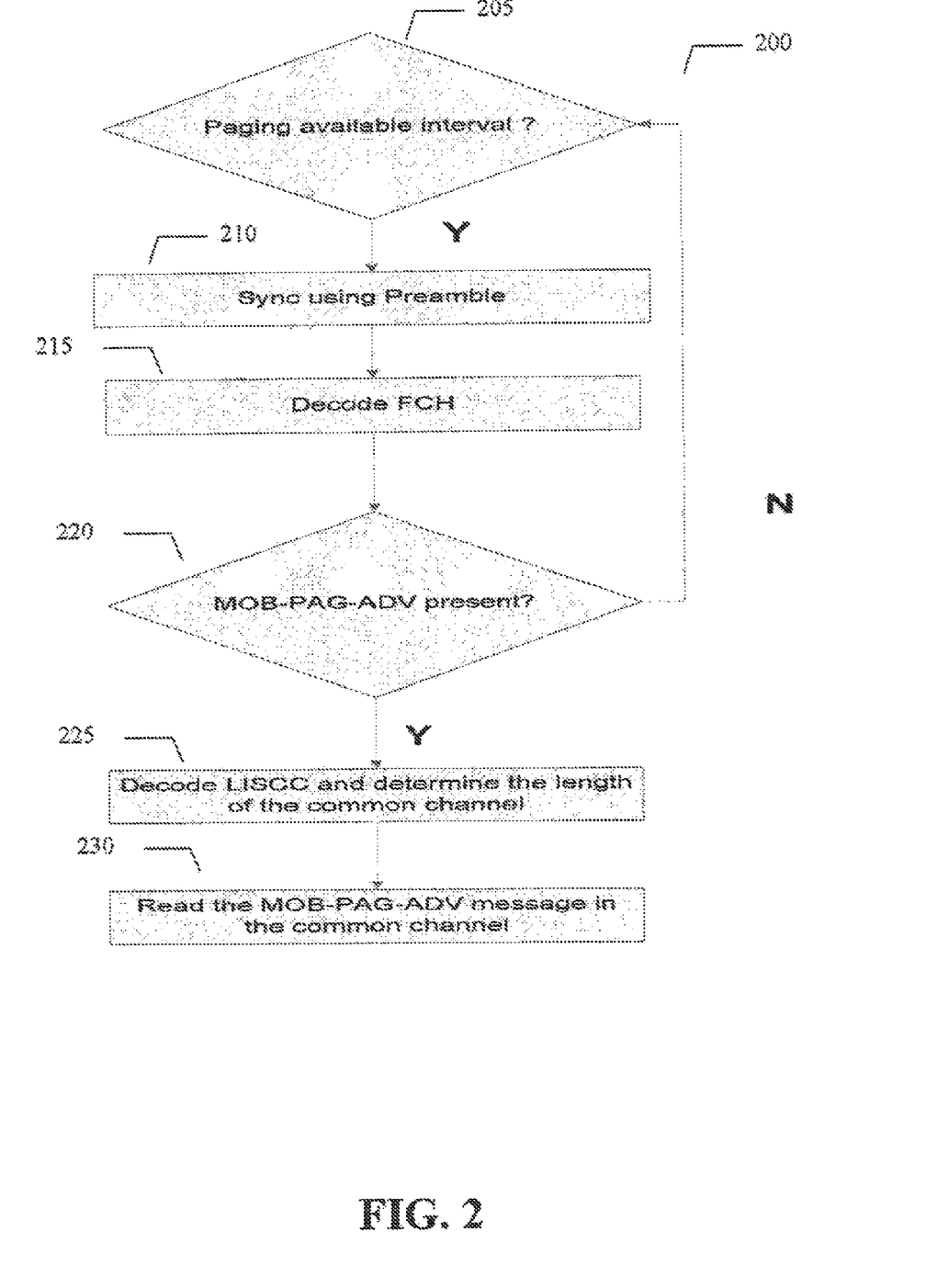
FIG. 2 is a flow chart of the operation of idle mode mobile stations (MSs) in accordance with an embodiment of the invention.
Figure 3:
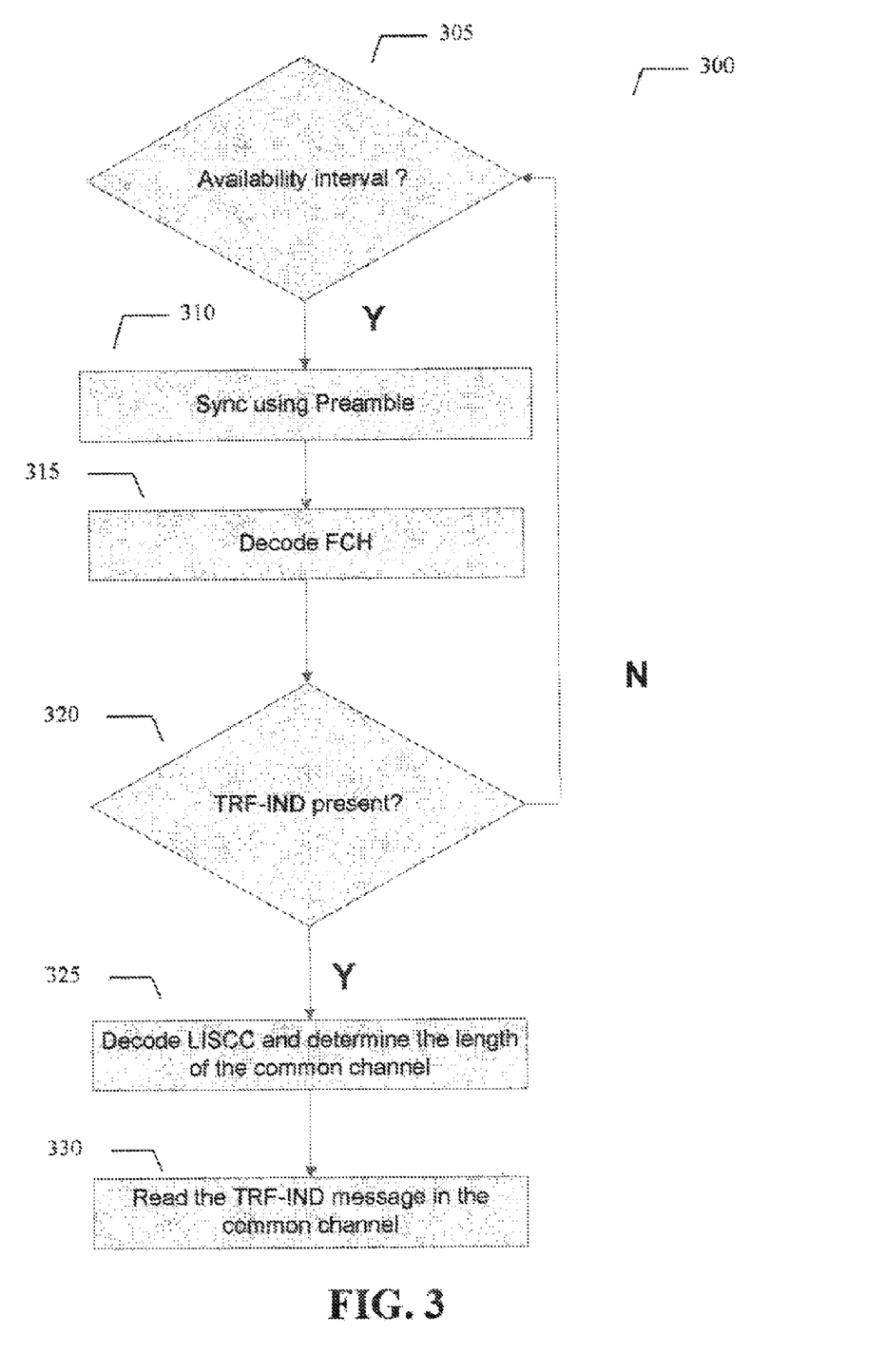
FIG. 3 is a flow chart of the operation of sleep mode MSs in accordance with an embodiment of the present invention.

FIGS. 2 and 3 illustrate flow charts depicting these steps for idle and sleep mode MSs, respectively. For the idle mode 200 of FIG. 2, the flow cat determines if paging is available at 205. If yes, the preamble is synced at 210 and FCH decoded at 215. At 220 a determination is made of MOB-PAG-ADV is present. If no, a return to 205 is accomplished. If yes at 220, decode LISCC and determine the length of the common channel at 225 and read the MOB-PAG-ADV message in the common channel at 230.

When an MS is either in state II or III, it can temporarily shut down all transmit and receive activities with the network. Therefore, these situations may be used as battery conserving and wireless resource saving opportunities. Wireless networks based on IEEE 802.16e use sleep mode and idle mode operations to take advantage of State II and State III, respectively. Thus, an MS in these networks operates in sleep mode when it does not receive or send traffic while active in one or more call sessions. Similarly, it operates in idle mode while not engaged in any active call session. The sleep and idle mode operations in IEEE 802.16e based wireless networks are briefly described below.

Sleep mode: Sleep mode is intended to minimize MS power usage and decrease the usage of air interface resources. Towards this end, when there is no traffic exchange between an MS and its base station (BS), the MS goes to sleep mode. While in sleep mode the MS alternates between intervals of availability and unavailability. During an unavailability interval an MS may power down its radio interface(s). On the other hand, during availability interval the sleep MS listens for any traffic indicator message sent by its BS to indicate the presence of traffic. The BS keeps track of the intervals of availability and unavailability for the sleep mode MS and sends a traffic indicator, referred as MOB_TRF-IND, message to the MS during latter's availability interval upon the arrival of traffic for this MS. Therefore, a sleep mode MS looks for the MOB_TRF-IND messages in the downlink frames during its availability interval. When a sleep mode MS receives a MOB_TRF-IND message it returns to normal mode of operation if the MOB_TRF-IND indicates the presence of traffic for this MS. Otherwise, the sleep mode MS continues its sleep mode operation.

Idle Mode: For significant time durations, mobile stations (MSs) are powered on in wireless networks but are not in an active call session. To use these durations as battery conserving and resource saving opportunities, Idle mode and Paging operations are described in IEEE 802.16e based mobile wireless networks. Per these procedures, the mobile terminal may enter a low-power mode called idle mode. There are specified mechanisms in IEEE 802.16e to let the MS to get back to active mode whenever required—e.g. when there is an incoming call for MS. This is usually carried out by sending a multicast or broadcast control message to the idle mode users. The control message is called mobile paging advertisement (MOB-PAG-ADV) message. MOB-PAG-ADV message contains the paging information, e,g., identification, of those MSs for which incoming calls are awaiting.

While in the idle mode, each user alternates between paging unavailable interval and paging listening interval. These two intervals constitute the PAGING_CYCLE. During the paging unavailable interval, the user can not be reached by any BS. On the other hand, during the paging listening interval, the user listens for possible paging messages and returns to normal mode of operation when receives a MOB-PAG-ADV that has its paging information.

Figure 1:
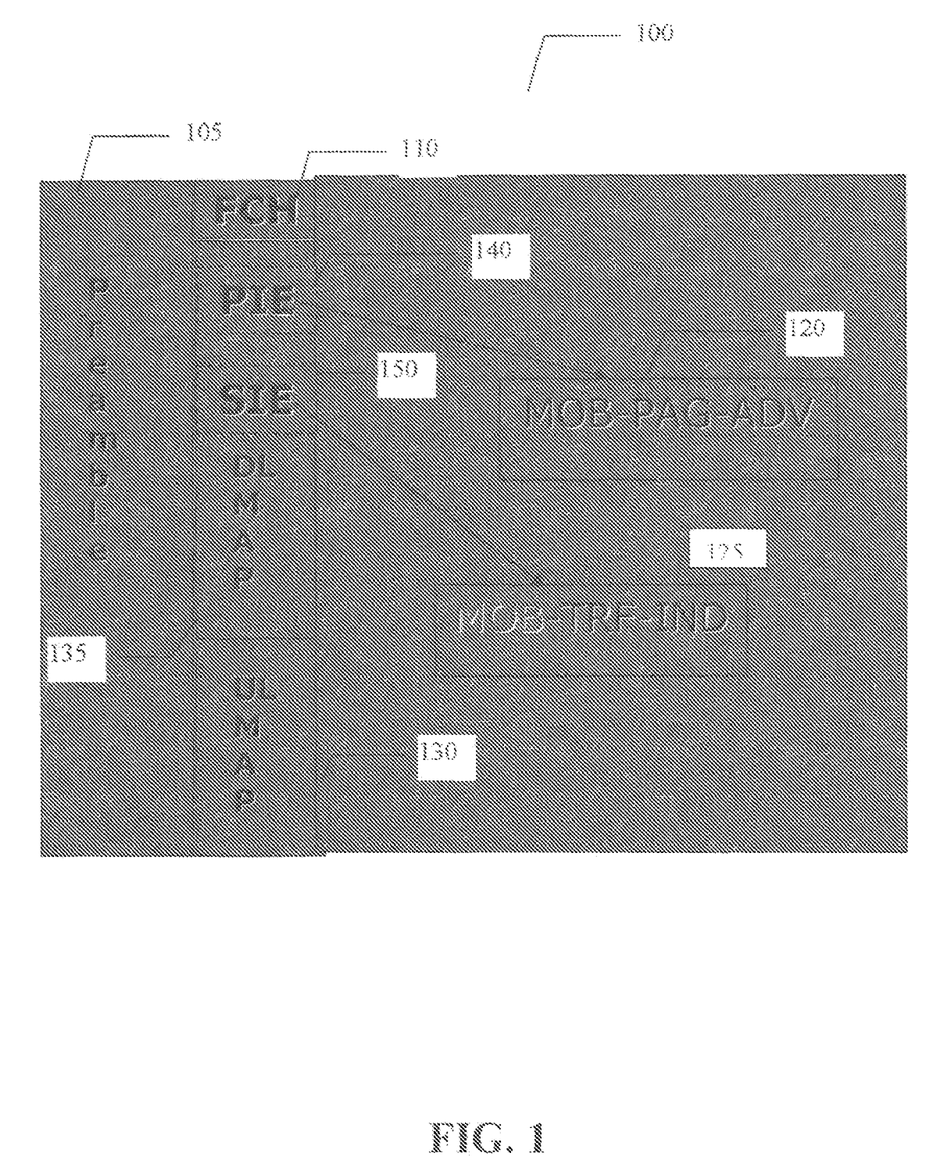
FIG. 1 is a IEEE 802.16e downlink (DL) frame showing sleep and idle mode control message transmission in an embodiment of the present invention.

As illustrated in FIG. 1 at 100, in IEEE 802.16e based wireless networks, a BS sends the MOB_TRF-IND 125 and MOB-PAG-ADV 120 messages using multicast or broadcast connections. FIG. 1 depicts a downlink IEEE 802.16e frame containing MOB-PAG-ADV 120 and MOB_TRF-IND 125 message. The downlink frame corresponds to an IEEE 802.16e based wireless system employing time division duplex (TDD) mode of operation. The frame starts with a preamble 105 that is used for synchronization followed by Frame Control Header (FCH) 110, which provides frame configuration information. FCH 110 is followed by downlink MAP (DL-MAP) 135 and uplink MAP (UL-MAP) 130 messages that contain sub-channel allocation and other control information for downlink (DL) and uplink (UL) sub-frames, respectively. The remaining part of the DL frame contains control and data traffic for different users.

Transmission and Reception of MOB-PAG-ADV Message

When the BS needs to send a MOB-PAG-ADV 120 message to page one or more idle mode MSs, it includes a paging information element (PIE) 140 in the DL MAP 135. The PIE 140 may indicate the actual location of the MOB-PAG-ADV 120 in the DL frame. An idle mode MS performs the following operations in its paging available interval to look for any MOB-PAG-ADV message that contains its paging information.

Step 1: It synchronizes with the serving BS using the preamble 105;

Step 2: Then, it decodes the FCH 110 to learn about the frame configuration information;

Step 3: After this it decodes the DL MAP 135 and looks for the presence of a PIE 140. If the MS does not find the PIE 140 it stops any further processing of the current DL frame.

Step 4: If the PIE 140 is present, then it reads the part of the DL frame containing the MOB-PAG-ADV 120 message and checks if the message has its paging information or not. If present the MS returns to normal mode of operation else it remains in idle mode.

Transmission and Reception of MOB_TRF-IND Message

Similarly, when the BS needs to send a MOB_TRF-IND 125 message to indicate the presence of traffic for one or more of the sleep mode users, it includes a sleep information element (SIE) 150 in the DL MAP 135. The SIE 150 indicates the actual location of the MOB_TRF-IND 125 in the DL frame. A sleep mode MS performs the following operations in its availability interval to look for any MOB_TRF-IND 125 message addressed to it.

Step 1: It synchronizes with the serving BS using the preamble 105;

Step 2: Then it decodes the FCH 110 to learn about the frame configuration information.

Step 3: After this it decodes the DL MAP 135 and look for the presence of a SIE 150. If the MS does not find the SIE 150 it stops any further processing of the current DL frame.

Step 4: If the SIE 150 is present, then it reads the part of the DL frame containing the MOB_TRF-IND 125 message and checks if the message indicates the presence of its traffic. If present the MS returns to normal mode of operation else it remains in sleep mode.

IEEE 802.16e specifies that the PIE contains the idle mode multicast CID or broadcast CID along with the location of the MOB-PAG-ADV 120 message that is identified by this CID. Similarly, SIE contains the sleep mode multicast CID or broadcast CID along with the location of the MOB_TRF-IND 125 message that is identified by this CID. It may be noted that other forms of PIE and SIE may be specified in other OFDMA based wireless networks. However, the operational principles of paging and traffic indicator messages may still be the same as that of IEEE 802.16e based wireless networks. In all such cases, embodiments of the present invention may be applied to carry out efficient transmission of the paging and sleep mode control messages. It may be noted that the above discussion only considers the transmission of MOB-PAG-ADV 120 message related to idle mode and MOB_TRF-IND 125 message related to sleep mode. Other control messages may also be transmitted in a similar fashion to these users and it is understood that the present invention is not limited to any particular control messages as various embodiments of the present invention may be applied to the efficient transmission of any control messages to the idle and sleep mode users.

In an embodiment of the present invention, MOB-PAG-ADV 120 and MOB_TRF-IND 125 messages may be used as representative control messages to the idle and sleep mode users. Again, it is anticipated that the proposed invention is applicable for the transmission of any other control messages to the idle and sleep mode users.

An embodiment of the present invention proposes the use of need-based common channel for the transmission of control messages to idle mode and sleep mode MSs. Thus, whenever required, the BS may transmit the MOB-PAG-ADV 120 and MOB_TRF-IND 125 messages in a fixed location or relatively fixed location of the DL frame. A fixed location is defined as a location that has fixed OFDMA symbol offset and OFDMA sub-channel offset. A relatively fixed location is defined as a location that is after some of the well known fields of an OFDMA frame. For example, the location after the preamble, FCH, DL MAP, and UL MAP of an OFDMA frame. This fixed or relatively fixed location in the DL frame may be referred to as common channel in the description provided below. There may be different methodologies for allocating common channel for sleep and idle mode users. One such option, although the present invention is not limited in this respect, is to have separate DL common channels for sleep and idle mode users. Another option is to have one common channel for the sleep and idle mode users. Again, there can be other methods for the allocation of the common channels to sleep and idle mode users. An embodiment of the present invention may be applicable irrespective of the exact methodologies used to allocate the common channel to the idle and sleep mode users. Although not limited in this respect, in an embodiment of the present invention it is assumed that one common channel is used for both sleep and idle mode. When relatively fixed location is used, the common channel can be located after the DL and UL MAPs in an OFDMA frame. Other relatively locations can be used and an embodiment of the present invention may be applicable irrespective of the relatively fixed location used for the common channel. When fixed location is used for the common channel, the information about the location of the common channel can be informed to the MSs through broadcast control information transmitted by the BS such as downlink channel descriptor (DCD) message in IEEE 802.16e based wireless networks. Similarly, when relatively fixed location is used for the common channel, the information about the location of the common channel can be informed by the DCD message in IEEE 802.16e based wireless networks. For example, the DCD message can convey that the common channel is located after the preamble, FCH, DL and UL MAP. Thus, to determine the location of the common channel, the idle mode and sleep mode SSs need information about the length of the preamble, FCH, DL MAP and UL MAP. Out of these the length of preamble and FCH is usually fixed in each OFDMA frame. FCH specifies the length of the DL and UL MAP. The idle and sleep mode SSs learn about the length of DL and UL MAP from the FCH. Then, using the length of preamble, FCH, DL MAP and UL MAP, the idle and sleep mode SSs learn about the location of the common channel. Other methods can also be used to inform the location of the common channel(s) for idle and sleep mode.

There may be different techniques for the BS to indicate the presence of MOB-PAG-ADV 120 and MOB_TRF-IND 125 messages in a DL frame. Although not limited in this respect, two possible techniques are as follows.

One technique is that the BS indicates the presence of MOB-PAG-ADV 120 and MOB_TRF-IND 125 messages in the FCH 110 part of the DL frame. In another technique, the BS may indicate the presence of MOB-PAG-ADV 120 and MOB_TRF-IND 125 messages after the DL MAP.

It may be noted that the proposed invention is applicable irrespective of the exact technique used by the BS to indicate the presence of MOB-PAG-ADV 120 and MOB_TRF-IND 125 messages in a DL frame.

There are different ways to implement the above techniques. Although not limited in this respect, three possible methods are described as follows for the first technique. The implementation of these approaches is similar for the second technique except that the sleep and idle flags (described below) are located after the DL-MAP 135 instead of FCH 110 and whenever required (as indicated by the sleep and idle flags) Logical Idle Sleep Control Code (LISCC) (described below) is located after these flags.

Method 1: One way is to use separate sleep and idle flags in the FCH 110 to denote the presence or absence of these messages. When at least one of the flags is true, FCH 110 is followed by a fixed length control code referred as Logical Idle Sleep Control Code (LISCC) that contains the length of the common channel as shown in Table 1 below, where L1 and L2 represent the length of the MOB-PAG-ADV 120 and MOB_TRF-IND 125 messages, respectively. It may be noted that both L1 and L2 are present when the both sleep and idle mode flags in FCH 110 have positive indication. On the other hand, either L1 or L2 is present when only one of the flags in FCH has positive indication. Thus, the total length of the common channel is L1+L2. HCS is the header check sum and has n number of bits.

TABLE 1

Structure of LISCC for method 1.

| LEN (L1) | LEN (L2) | HCS (n) |
|----------|----------|---------|

Method 2: In another way, only one flag may be used in FCH to indicate the presence of sleep or idle or both sleep and idle messages. In this case, it is not clear whether only sleep or only idle or both sleep and idle messages are present. However, this can be clarified by using the structure for LISCC shown below in Table 2.

TABLE 2

Structure of LISCC for method 2.

| P A G (1) | T R F (1) | LEN (L1) | LEN (L2) | HCS (n) |
|-----------|-----------|----------|----------|---------|

The PAG (1/0) bit shows the presence or absence of MOB-PAG-ADV message in the current DL frame. Similarly, TRF (1/0) bit shows the presence or absence of MOB_TRF-IND message in the current DL frame. LEN (L1) is present only when PAG=1 and LEN (L2) is present only when TRF=1. When PAG=1 and TRF=1, both LEN (L1) and LEN (L2) are present. HCS (n) is the header check sum. Thus, the total length of the common channel is L1+L2.

Method 3: This method can be applicable when idle mode and sleep mode MSs are classified into different paging and sleep groups, respectively. In this case, the LISCC can be modified to indicate whether MOB-PAG-ADV and MOB_TRF-IND messages are present for MSs in any particular paging and sleep groups, respectively. If the number of paging and sleep groups are r and t, respectively, one possible structure of LISCC is shown in the Table 3.

TABLE 3

Structure of LISCC for method 3.

| PAG (1) | TRF (1) | r (a) | t (b) | P1 (1) | P2 (2) | ... | Pr (1) | S1 (1) | S2 (1) | ... | St (1) | LEN (L1) | LEN (L2) | HCS (n) |
|---------|---------|-------|-------|--------|--------|-----|--------|--------|--------|-----|--------|----------|----------|---------|

If r and t are known to the idle and sleep mode MSs (for example, through the DCD message in IEEE 802.16e), then they need not be part of LISCC. This can save the bits that are used to transmit this information. P1, P2, etc indicate whether a MOB-PAG-ADV message is present for idle mode MSs of paging group P1, P2, etc, respectively. Similarly, S1, S2, etc indicate whether a MOB_TRF-IND message is present for sleep mode MSs of sleep group S1, S2, etc, respectively.

After the idle mode MSs learn about the presence of control messages for them in the current DL frame using either of above described Method 1 or Method 2 and determine the length of the common channel, they may decode the information in the common channel. It may be noted that the idle mode MSs know the starting location of the common channel as it is fixed and then they learn about the length of the common channel as L1+L2. When both MOB-PAG-ADV and MOB_TRF-IND messages are present in the common channel, MOB-PAG-ADV message of length L1 is located at the beginning followed by MOB_TRF-IND message of length L2. Any other order of arrangement of these two messages is also possible. Moreover, the common channel can contain other control messages that are required for the successful transmission of the paging and sleep control messages, for example, error correcting coding for these messages.

Although not limited in this respect, it may be noted that the common channel may be used for the transmission of the MOB-PAG-ADV or MOB_TRF-IND or both of these messages only when these messages are required to be transmitted over the air link. When neither of these messages are present, the common channel may be used to other carry other types of traffic. Moreover, the length of the common channel may be set based on the need, i.e., L1+L2. This L1+L2 denote the length of the common channel.

Although not limited in this respect, an embodiment of the present invention may be summarized as follows: First, the idle and sleep mode MSs decode the FCH to learn about the presence of any control messages for them. If and only if they learn the presence of control messages for them in the current frame, they decode the LISCC that immediately follows the FCH and determine the length of the common channel. Then, they decode the control information in the common channel.

FIGS. 2 and 3 illustrate flow charts depicting these steps for idle and sleep mode MSs, respectively. For the idle mode 200 of FIG. 2, the flow cat determines if paging is available at 205. If yes, the preamble is synced at 210 and FCH decoded at 215. At 220 a determination is made of MOB-PAG-ADV is present. If no, a return to 205 is accomplished. If yes at 220, decode LISCC and determine the length of the common channel at 225 and read the MOB-PAG-ADV message in the common channel at 230.

For the sleep mode 300 of FIG. 3, the flow cat determines if paging is available at 305. If yes, the preamble is synced at 310 and FCH decoded at 315. At 320 a determination is made of MOB_TRF-IND is present. If no, a return to 305 is accomplished. If yes at 320, decode LISCC and determine the length of the common channel at 325 and read the MOB-PAG-ADV message in the common channel at 330. For the idle mode 300 of FIG. 3, the flow cat determines if paging is available at 305. If yes, the preamble is synced at 310 and FCH decoded at 315. At 320 a determination is made of MOB TRF-IND is present. If no, a return to 305 is accomplished. If yes at 320, decode LISCC and determine the length of the common channel at 325 and read the MOB TRF-IND message in the common channel at 330.

The proposed invention has several advantages, including: The idle and sleep mode MSs required to decode only the FCH of all the frames during their paging available interval and availability interval, respectively. They are required to decode the LISCC only if there is positive indication about the presence of control messages of their interest. On the other hand, using the existing methodology, the idle and sleep mode MSs decode the entire DL MAP and FCH of all the frames during there paging available interval and availability interval, respectively resulting in significant power consumption. Thus, the proposed method achieves significant reduction in power consumption by the idle and sleeps mode users learning of the presence of control messages for them.

The proposed method eliminated the need for PIE and SIE in the DL-MAP as the common channel location is fixed. Thus, it eliminates the overhead associated with PIE and SIE. It may be noted that the proposed method uses flags in FCH to indicate the presence of MOB-PAG-ADV and TRF-IND messages in a frame. However, it is only one or two bits which are negligible compared to the length of PIE and SIE.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Figure 4:
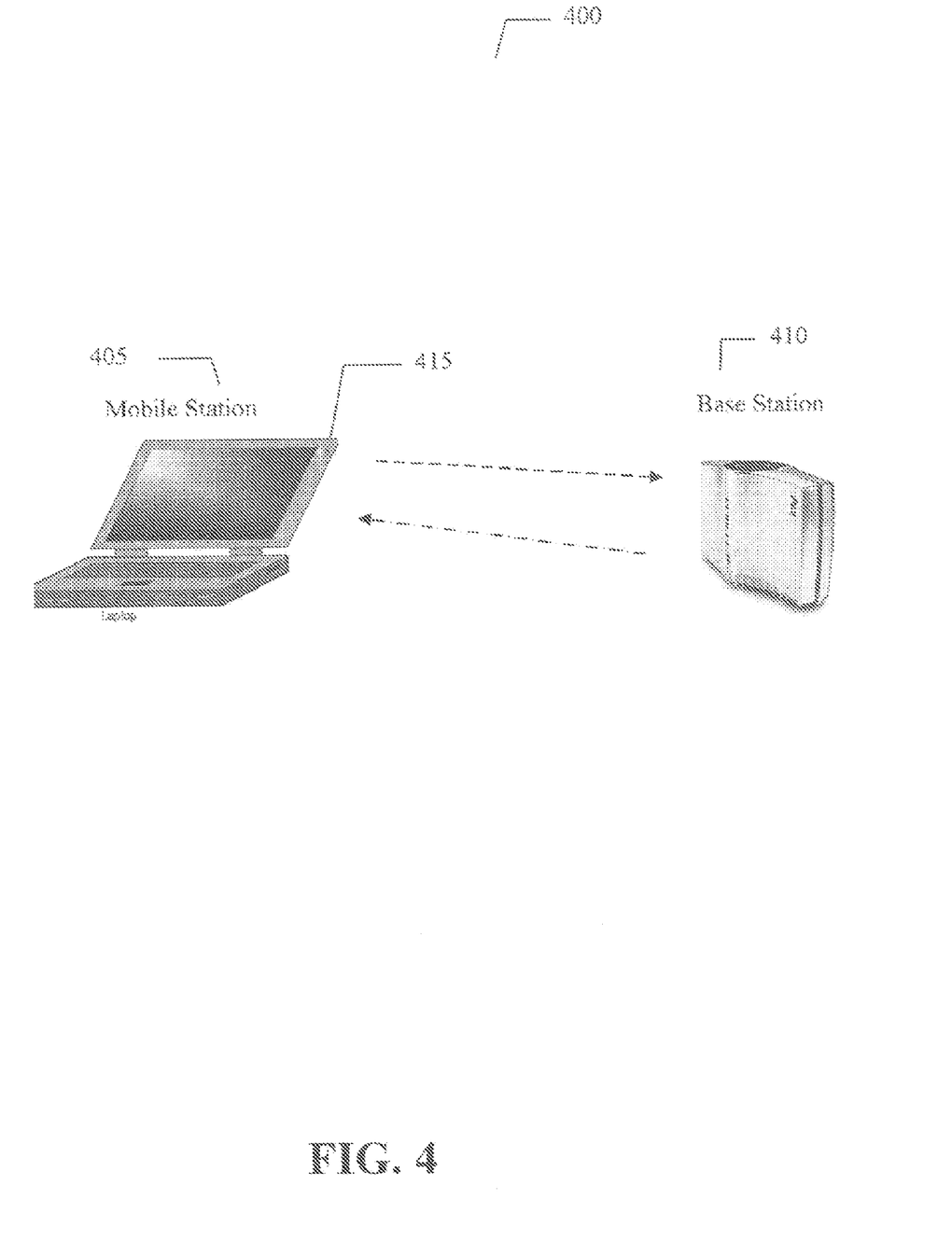
FIG. 4 illustrates a system according to one embodiment of the present invention.

Some embodiments of the invention may be implemented, for example, using a machine-readable medium or article which may store an instruction or a set of instructions that, if executed by a machine, for example, by system 400 of FIG. 4, by mobile station 405 of FIG. 4 which may include a processor (not shown) and antenna 415, or by other suitable machines, cause the machine to perform a method and/or operations in accordance with embodiments of the invention. Mobile station 405 may be in communication with base station 410. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

A machine-accessible medium provided above may provide instructions, which when accessed, may cause a machine to perform operations comprising using a need-based common channel for the transmission of control messages to idle mode and sleep mode mobile stations by a base station (BS) operable to communicate with said mobile stations. Further, the machine-accessible medium may further comprise said instructions causing said machine to perform operations further comprising decoding an FCH to learn about the presence of any control messages by said at least one idle or sleep mode MS, then if and only if it learns of the presence of control messages for it in a current frame, decoding a (Logical Idle Sleep Control Code) LISCC that immediately follows said FCH and determining the length of said common channel and then decoding control information in said common channel.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a base station (BS) to communicate with at least one mobile station (MS) that may be in an idle or sleep mode, said base station to use a need-based common channel for the transmission of control messages to said MS in said idle mode or sleep mode, wherein using said need-based common channel is accomplished by said at least one idle or sleep mode MS decoding a Frame Control Header (FCH) to learn about the presence of any control messages, then if and only if it learns of the presence of control messages for it in a current frame, it decodes a Logical Idle Sleep Control Code (LISCC) that immediately follows said FCH and determines the length of said common channel and then decodes control information in said common channel.

2. The apparatus of claim 1, wherein said need-based common channel has either fixed location or relatively fixed location in a downlink (DL) part of the frame.

3. The apparatus of claim 2, wherein said fixed location is defined as a location that has fixed OFDMA symbol offset and OFDMA sub-channel offset and said relatively fixed location is defined as a location that is after some well known fields of an OFDMA frame.

4. The apparatus of claim 1, wherein using said need-based common channel is accomplished for said at least one MS in said idle mode by:
syncing with a preamble of said common channel and decoding FCH to learn the presence of Mobile Paging Advertisement (MOB-PAG-ADV) message in said current frame during the paging available interval; and
decoding LISCC and determining the length of the common channel and reading the MOB-PAG-ADV message in said common channel if MOB-PAG-ADV is present.

5. The apparatus of claim 1, wherein using said need-based common channel is accomplished for said at least one MS in said sleep mode by:
syncing with a preamble of said common channel and decoding FCH to learn the presence of Mobile Traffic Indication (MOB-TRF-IND) message in the current frame during the availability interval; and
decoding LISCC and determining the length of the common channel and reading the MOB-TRF-IND message in said common channel if MOB-TRF-IND is present.

6. The apparatus of claim 1, wherein information about the location of said common channel is provided to said at least one MS through broadcast control information transmitted by said BS.

7. The apparatus of claim 1, wherein separate sleep and idle flags in said FCH are used to denote the presence or absence of said control messages.

8. The apparatus of claim 1, wherein only one flag is used in said FCH to indicate the presence of sleep or idle or both sleep and idle messages in said FCH.

9. The apparatus of claim 1, wherein when said at least one idle or sleep mode MS is classified into different paging and sleep groups, an LISCC is modified to indicate whether MOB-PAG-ADV and MOB_TRF-IND messages are present for said at least one MS.

10. A method, comprising:
using a need-based common channel for the transmission of control messages to idle mode and sleep mode mobile stations by a base station (BS) to communicate with said mobile stations; and
decoding an FCH (Frame Control Header) to learn about the presence of any control messages by said at least one idle or sleep mode MS, then if and only if it learns of the presence of control messages for it in a current frame, decoding a (Logical Idle Sleep Control Code) LISCC that immediately follows said FCH and determining the length of said common channel and then decoding control information in said common channel.

11. The method of claim 10, further comprising:
syncing, if said idle mode mobile station is in a paging available interval, with a preamble of a current frame and decoding FCH;
decoding LISCC and determining the length of the common channel; and
reading the Mobile Paging Advertisement (MOB-PAG-ADV) message in said common channel if MOB-PAG-ADV is present.

12. The method of claim 10, further comprising:
syncing using a preamble of the current frame and decoding FCH if said sleep mode mobile station is in an availability interval; and
decoding LISCC and determining the length of the common channel and reading the Mobile Traffic Indication (MOB-TRF-IND) message in said common channel if MOB_TRF-IND is present.

13. The method of claim 10, further comprising providing information about the location of said common channel to said at least one MS through broadcast control information transmitted by said BS.

14. The method of claim 10, further comprising using separate sleep and idle flags in said FCH to denote the presence or absence of said control messages.

15. The method of claim 10, further comprising using only one flag in said FCH to indicate the presence of sleep or idle or both sleep and idle messages in said FCH.

16. The method of claim 10, further comprising when said at least one idle or sleep mode MS is classified into different paging and sleep groups, an LISCC is modified to indicate whether MOB-PAG-ADV and MOB_TRF-IND messages are present for said at least one MS.

17. A non-transitory machine-accessible medium that provides instructions, which when accessed, cause a machine to perform operations comprising:
using a need-based common channel for the transmission of control messages to idle mode and sleep mode mobile stations by a base station (BS) to communicate with said mobile stations; and
decoding an FCH (Frame Control Header) to learn about the presence of any control messages by said at least one idle or sleep mode MS, then if and only if it learns of the presence of control messages for it in a current frame, decoding a (Logical Idle Sleep Control Code) LISCC that immediately follows said FCH and determining the length of said common channel and then decoding control information in said common channel.

18. The machine-accessible medium of claim 17, further comprising said instructions causing said machine to perform operations further comprising
syncing in a paging available interval, with a preamble of the current frame and decoding FCH;
decoding LISCC and determining the length of the common channel; and
reading the Mobile Paging Advertisement (MOB-PAG-ADV) message in said common channel if MOB-PAG-ADV is present.

19. The machine-accessible medium of claim 17, further comprising said instructions causing said machine to perform operations further comprising
syncing using a preamble of the current frame and decoding FCH in an availability interval; and
decoding LISCC and determining the length of the common channel and reading the Mobile Traffic Indication (MOB-TRF-IND) message in said common channel if MOB_TRF-IND is present.

20. The non-transitory machine-accessible medium of claim 17, further comprising said instructions causing said machine to perform operations further comprising providing information about the location of said common channel to said at least one MS through broadcast control information transmitted by said BS.

21. The non-transitory machine-accessible medium of claim 17, further comprising said instructions causing said machine to perform operations further comprising using separate sleep and idle flags in said FCH to denote the presence or absence of said control messages.

22. The non-transitory machine-accessible medium of claim 17, further comprising said instructions causing said machine to perform operations further comprising using only one flag in said FCH to indicate the presence of sleep or idle or both sleep and idle messages in said FCH.

23. The non-transitory machine-accessible medium of claim 17, further comprising said instructions causing said machine to perform operations further comprising when said at least one idle or sleep mode MS is classified into different paging and sleep groups, an LISCC is modified to indicate whether MOB-PAG-ADV and MOB_TRF-IND messages are present for said at least one MS.

24. A system, comprising:
a mobile station (MS);
a base station (BS) operable to communicate with said mobile station (MS), wherein said base station is adapted to use a need-based common channel for the transmission of control messages to said mobile station when it is in idle mode and sleep modes, wherein using said need-based common channel is accomplished by said at least one idle or sleep mode MS decoding a (Frame Control Header) FCH to learn about the presence of any control messages, then if and only if it learns of the presence of control messages for it in a current frame, it decodes a (Logical Idle Sleep Control Code) LISCC that immediately follows said FCH and determines the length of said common channel and then decodes control information in said common channel.

25. The apparatus of claim 24, further comprising a bi-directional antenna associated with said BS.

* * * * *